United States Patent [19]

Cohen et al.

[11] Patent Number: 5,245,835
[45] Date of Patent: Sep. 21, 1993

[54] METHOD AND APPARATUS FOR INTERIOR SPACE CONDITIONING WITH IMPROVED ZONE CONTROL

[75] Inventors: Barry M. Cohen, Newton Centre; Andrew Popelka, Acton, both of Mass.

[73] Assignee: Electric Power Research Institute, Inc., Palo Alto, Calif.

[21] Appl. No.: 927,818

[22] Filed: Aug. 10, 1992

[51] Int. Cl.⁵ .................... F25B 29/00; F25D 17/02
[52] U.S. Cl. ................................ 62/159; 62/185; 62/201; 165/22; 165/50; 236/1 B
[58] Field of Search ............... 62/160, 185, 201, 180, 62/208, 203, 209, 159; 165/22, 50; 236/1 B, 9 A, 9 R; 364/505, 557; 237/8 R, 8 A

[56] References Cited

U.S. PATENT DOCUMENTS

| | | | |
|---|---|---|---|
| 3,996,759 | 12/1976 | Meckler | 62/2 |
| 4,150,788 | 4/1979 | Matsumoto et al. | 165/22 X |
| 4,192,455 | 3/1980 | Rasmussen et al. | 165/22 X |
| 4,253,153 | 2/1981 | Bitterli et al. | 364/505 |
| 4,393,662 | 7/1983 | Dirth | 236/1 B X |
| 4,475,685 | 10/1984 | Grimado et al. | 236/46 R |
| 4,487,028 | 12/1984 | Foye | 165/22 X |
| 4,739,624 | 4/1988 | Meckler | 62/160 |
| 4,809,516 | 3/1989 | Jones | 62/160 |
| 4,844,335 | 4/1989 | McKinley | 237/8 R |
| 4,884,214 | 11/1989 | Parker et al. | 364/505 |
| 4,886,110 | 12/1989 | Jackson | 165/22 |
| 4,897,798 | 1/1990 | Cler | 364/505 |
| 4,909,041 | 3/1990 | Jones | 62/99 |
| 4,941,325 | 7/1990 | Nuding | 62/158 |
| 5,024,265 | 6/1991 | Buchholz et al. | 165/22 |

OTHER PUBLICATIONS

"Applied Heat Pump Systems", 1987 HVAC Handbook, pp. 9.1–9.15.

Primary Examiner—Harry B. Tanner
Attorney, Agent, or Firm—Flehr, Hohbach, Test, Albritton & Herbert

[57] ABSTRACT

An interior thermal conditioning method and apparatus with improved zone control is disclosed. The thermal conditioning apparatus, such as a heat pump assembly, generates a desired thermal condition which is conveyed by a thermal distribution medium to a number of zones within a multiple zone building. Each zone includes a heat exchange device for receiving the thermal distribution medium. Each zone also includes a thermostat which is used to set a desired temperature range and to indicate the prevailing temperature. When the prevailing temperature is inconsistent with the desired temperature range, a conditioning request is generated. Rather than immediately responding to the conditioning request, the heat pump controller assesses the temperature of the thermal distribution medium to determine whether it is within a target range. If the thermal distribution medium is not within the target range, execution of the conditioning request is delayed while the heat pump is modulated to produce the desired thermal distribution temperature. Additional conditioning requests may be generated during this modulation period. Conditioning requests are processed after the desired thermal distribution temperature is established. Various criteria may be used to establish conditioning request priorities. Conditioning requests may be swapped with former conditioning requests which are executing. The controller establishes a steady and efficient operation of the heat pump.

20 Claims, 5 Drawing Sheets

Status Table

| Zone-A Off | Zone-B Off | Zone-C On | Zone-D Off | • • • |

Figure 4A

Execution Table

| 1. Zone-A: On |
| 2. Zone-B: On |
| 3. Zone-C: Off |
| 4. Zone-D: On |
| • • • |

Figure 4B

METHOD AND APPARATUS FOR INTERIOR SPACE CONDITIONING WITH IMPROVED ZONE CONTROL

BRIEF DESCRIPTION OF THE INVENTION

This invention generally relates to the thermal conditioning of an interior space. More particularly, this invention describes a thermal conditioning scheme which produces improved thermal efficiency and comfort through independent control of zones in a building.

BACKGROUND OF THE INVENTION

Heating, Ventilation, and Air Conditioning (HVAC) of building interiors may be accomplished through a variety of methods. One method is the use of a heat pump. In its most general form, a heat pump employs electrical energy to remove heat from a cool region and then delivers the heat to a warmer location. Generally, this is accomplished by conveying refrigerant at a low pressure and low temperature from an evaporator to a compressor. The compressor performs work on the refrigerant and transforms it into a high temperature vapor which is conveyed to a condenser. The liquid from the condenser is expanded into a mixture of cold liquid and vapor, and is then vaporized at the evaporator. The cycle is then repeated.

A heat pump may be used for either heating or cooling. This dual purpose thermal conditioning is generally accomplished by operating the heat exchanger as a condenser within the building for heating during the winter, and then operating it as an evaporator for cooling during the summer.

Generally, three types of heat pumps are commercially available. One type is a variable speed heat pump which, as its name implies, operates at continuously variable speeds, and thus enjoys a wide thermal output spectrum. Another commercially available device is a multiple speed heat pump. A multiple speed heat pump generally operates at a low speed or at a high speed. The third, and most common, type of heat pump is the single speed heat pump.

The desired thermal condition produced by the heat pump may be distributed throughout the building by the use of a thermal distribution system. An air distribution system is the most common. A hydronic system may also be used. In a hydronic system, circulated water distributes the thermal output of the heat pump. In such a system, a delivery conduit routes the liquid to a particular zone or region within the building. A heat exchanger is positioned at each zone. The ambient air within the zone is either heated or cooled by the heat exchanger to maintain the desired condition in the zone. After exiting the heat exchanger, the liquid is re-conveyed to the heat pump by a return conduit. The heat exchangers used in a building are typically fan coil units which include a finned heat transfer coil in close proximity with a fan which forces room air over the heat transfer coil. Other types of heat exchangers are also used in hydronic distribution systems.

It is generally desirable for a building to have as many independently controlled zones as possible. Multiple independently controlled zones permit a variety of thermal conditions. That is, an occupant may tailor the ambient condition in his or her own zone without impacting the conditions in another zone. In addition, multiple zone systems can maintain uniform conditions throughout a building, despite variations in the heating or cooling loads within zones. Such variations may be caused by differences in thermal insulation, the quantity or quality of heat generating appliances, or the number of occupants within a zone. Another advantage of a multiple zone system is that it can be energy efficient by isolating unused zones.

While multiple independent zones are highly desirable, they also introduce a number of thermal efficiency problems. In particular, the control unit must be responsive to widely varying demands of the independent zones. To successfully achieve this, the speed of the heat pump must be varied constantly. This can cause the temperature of the thermal transfer fluid to widely vary from its desired average or mean value. For the heat pump to operate most efficiently, or most usefully, its delivery temperatures in both heating and cooling must be closely controlled. Delivery temperatures too high in heating or too low in cooling cause inefficiency. Delivery temperatures too high in cooling and too low in heating cause discomfort.

In the heating mode, meeting the load may require supplemental heating. This heating is commonly delivered by electrical resistance heaters, but other sources, such as natural gas, may be used. For a heat pump to be efficient, the use of supplemental heating, especially if it is thermal resistance heating, must be minimized.

OBJECTS AND SUMMARY OF THE INVENTION

It is a general object of the present invention to provide a novel control scheme, with improved thermal efficiency, for interior space conditioning.

It is another object of the present invention to provide a thermal conditioning apparatus which meets varying thermal conditions while minimizing variations of the temperature of the thermal transfer fluid.

It is another object of the present invention to provide a thermal conditioning apparatus which minimizes the use of supplemental thermal conditioning elements.

These and other objects are obtained by an interior thermal conditioning method and apparatus with improved zone control. The thermal conditioning apparatus, such as a heat pump assembly, generates a desired thermal condition which is conveyed by a thermal distribution medium to a number of zones within a multiple zone building. Each zone includes a heat exchange device for receiving the thermal distribution medium. Each zone also includes a thermostat which is used to set a desired temperature range and to indicate the prevailing temperature. When the prevailing temperature is inconsistent with the desired temperature range, a conditioning request is generated. Rather than immediately responding to the conditioning request, the heat pump controller assesses the temperature of the thermal distribution medium to determine whether it is within a target range. If the thermal distribution medium is not within the target range, execution of the conditioning request is delayed while the heat pump is modulated to produce the desired thermal distribution temperature. Additional conditioning requests may be generated during this modulation period. Conditioning requests are processed after the desired thermal distribution temperature is established. Various criteria may be used to establish conditioning request priorities. Conditioning requests may be swapped with former conditioning requests which are executing. The controller establishes a steady and efficient operation of the heat pump.

BRIEF DESCRIPTION OF THE DRAWINGS

For a better understanding of the nature and objects of the invention, reference should be made to the following detailed description taken in conjunction with the accompanying drawings, in which:

FIG. 4A is a representative depiction of a status table which is used in accordance with the zone controller of the invention.

FIG. 4B is a representative depiction of a task storage structure which is used in accordance with the zone controller of the invention.

Like reference numerals refer to corresponding parts throughout the several views of the drawings.

DETAILED DESCRIPTION OF THE INVENTION

Figure 1:
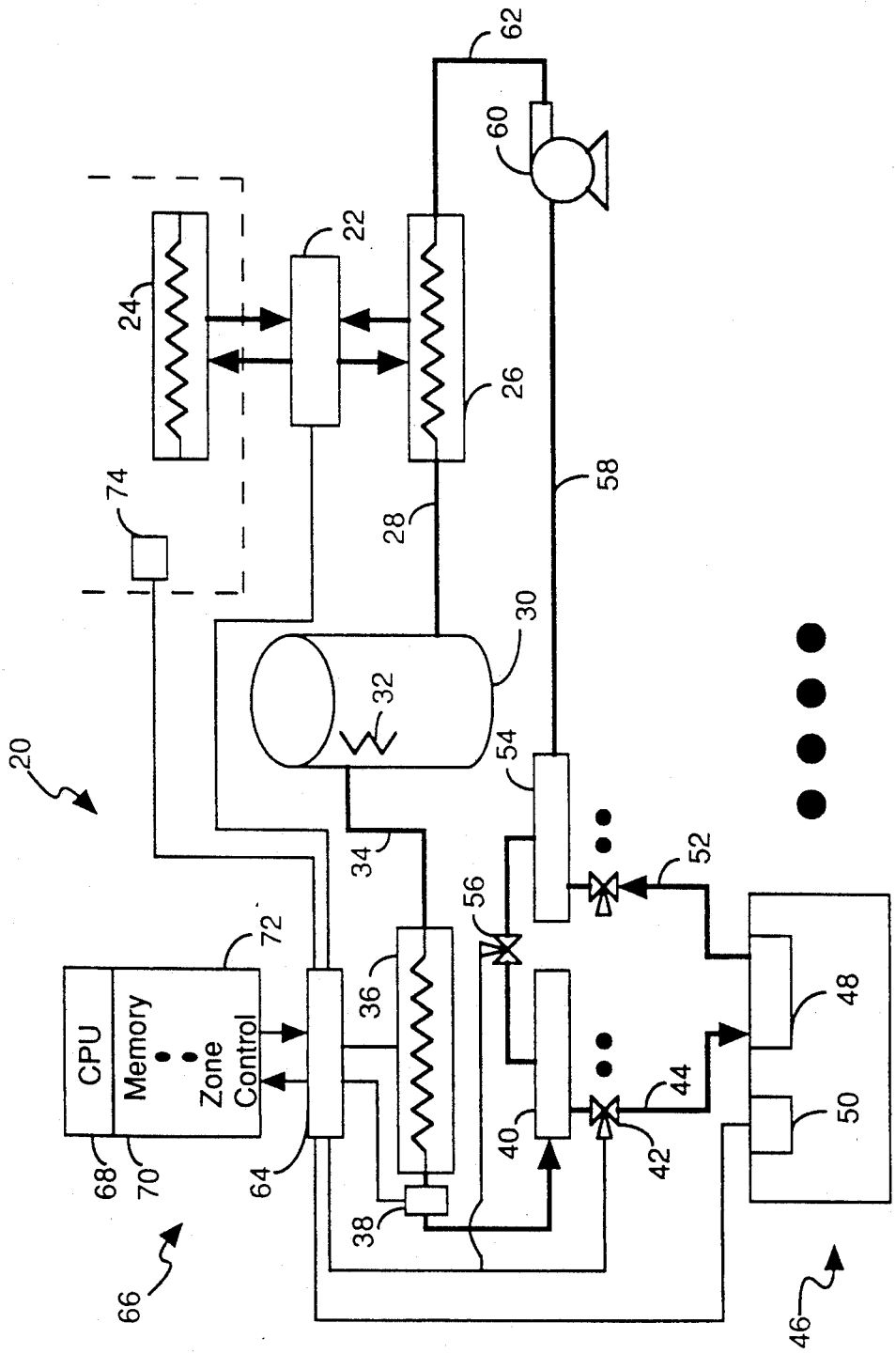
FIG. 1 is a simplified schematic view of a thermal conditioning assembly which may be used in accordance with the invention.

The interior space conditioning method and apparatus of the invention is applicable to a variety of physical devices. By way of example, the invention will be disclosed in the context of a heat pump assembly. Referring to FIG. 1, a thermal conditioning assembly 20 is disclosed. The thermal conditioning assembly 20 includes a heat pump 22. The heat pump 22 circulates a refrigerant between heat exchanger 24 and heat exchanger 26. In one embodiment, each heat exchanger may be either a condenser or an evaporator, depending upon the mode of operation of the assembly 20. In another embodiment, the roles of the condenser and evaporator are fixed and a thermal transfer media is manipulated to make appropriate contact with either the condenser or evaporator.

By way of example, a heat generation mode will be assumed throughout the disclosure. Thus, heat exchanger 24 is an evaporator which is preferably placed external to the region to be heated (as indicated by the lines in phantom); generally, this external region will be outdoors, but it may be underground, a storage tank, or other region. The heat exchanger 26 is a condenser which transfers heat to a thermal distribution medium.

The thermal distribution medium is preferably water, but it may also be any other thermally conductive fluid. The thermal distribution medium is conveyed by initial distribution conduit 28 to a thermal storage device 30, which includes a resistive heating element 32. The thermal storage device, if used, may be one or more water tanks, as will be more fully described below.

From the thermal storage device 30, the distribution medium is conveyed by conduit 34 to thermal conditioning apparatus 36, which is typically an electric resistive heater. The operation of the supplemental thermal conditioning apparatus 36 will be discussed below.

The thermal distribution medium is sensed by a thermometer 38 and is conveyed to an interchange distribution device 40, such as a manifold. A number of switching devices 42 may be coupled to the interchange device 40 to direct the thermal distribution medium through an individual distribution conduit 44 to a desired location. Alternately, the thermal distribution medium may be circulated to all zones at all times of circulation with transfer to the conditioned space being controlled by a transfer device, such as a fan.

The desired location will generally be a single zone 46 within a multiple zone structure. For instance, a single room within a building. Each zone 46 includes a heat exchange device 48 and a thermostat 50. The heat exchange device 48 may be a fan coil. Supplemental heating may form a portion of the heat exchange device 48.

The thermal distribution medium leaves the heat exchange device 48 by individual return conduit 52, it subsequently travels through a switching device 42, into an interchange return device 54. A bypass from the interchange distribution device 40 to the interchange return device 54 may be provided by bypass switching device 56.

The thermal distribution medium leaves the interchange return device 54 via primary return conduit 58 and is recirculated by pump 60 to the heat exchanger 26. The positioning of the pump 60 is not critical. There are also several feasible variations of the positioning of the thermal storage tank 30 and the supplemental thermal conditioning apparatus 36 which lend themselves to the control strategy of the invention.

The operation of the thermal conditioning assembly 20 is governed by a control mechanism 66, which may form a portion of heat pump 22. The control mechanism 66 is coupled to an appropriate transducer interface 64 for communicating with the individual physical components. In particular, the transducer interface 64 is directly coupled to heat pump 22, supplemental thermal conditioning apparatus 36, switching devices 42, bypass switching device 56, thermostats 38 and 50, and an outdoor thermometer 74.

Figure 2:
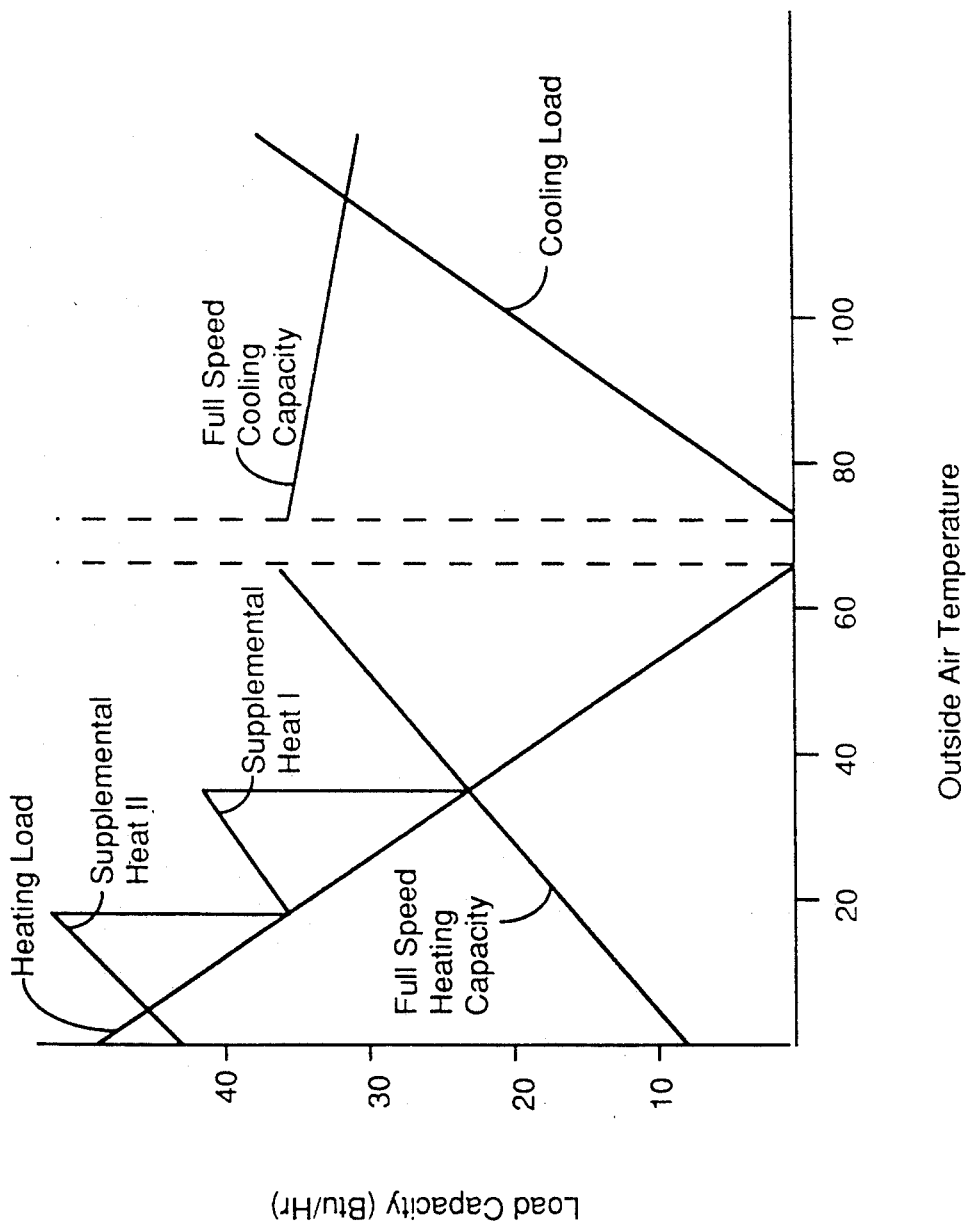
FIG. 2 is a representative graph of a heat pump assembly's performance characteristics as a function of load capacity and outside air temperature.

The thermal conditioning assembly 20 of FIG. 1 includes many standard components which are known in the art. The thermal interaction between a heat pump and its thermal load is characterized in FIG. 2. FIG. 2 depicts the typical relationships between a building thermal load as a function of outdoor temperature and the full speed output of an air-source heat pump. Both cooling and heating modes are depicted in the FIGURE. The points at which the loads and full speed capacities of the heat pump intersect are known in the art as balance points. Above the cooling balance point, the system cannot meet the load and the zone temperature cannot be held. Below the balance point, a single speed heat pump will cycle on and off, while a variable speed heat pump will modulate.

Below the heating balance point the heat pump cannot meet the load even at full output. To prevent discomfort, while simultaneously avoiding the need for over-sizing the heat pump, supplemental thermal conditioning should be applied at this juncture. Supplemental thermal conditioning is typically controlled by the difference between the set point and the actual temperature on the thermostat. Supplemental thermal conditioning is utilized until the difference between the set point and the actual temperature is reduced to a tolerable level, at which point only the heat pump operates. Thus, the supplemental heat operates to attempt to fill the area between the load line and the heat pump capacity line.

To obtain efficient performance from a heat pump, a careful control strategy must be designed. There are several potential problems associated with zone control mechanisms. One problem is that the heat pump speed is continuously altered to meet varying thermal conditions. This can cause the temperature of the thermal distribution medium to widely vary from its average or mean value. Consequently, the distribution medium temperature may enter regions of either low heat pump efficiency or occupant discomfort.

Another potential problem associated with zone control heat pump control mechanisms relates to the use of supplemental thermal conditioning devices. Indiscriminate use of such devices results in inefficiencies. Consequently, the use of supplemental thermal conditioning devices must be minimized.

The present invention is directed toward control mechanism 66 and its resultant operation of the remaining components of the thermal conditioning assembly 20. In particular, the control mechanism 66 of the present invention results in an efficient operation of the thermal conditioning assembly 20 which overcomes many potential control problems for space conditioning of a multiple zone structure.

The control mechanism 66 preferably includes a Central Processing Unit (CPU) 68 with an associated memory 70. The memory 70 of the control mechanism 66 stores a zone control 72 program and standard execution programs. Interactions between a CPU and programs stored in memory are known in the art. Similarly, one skilled in the art is capable of using the CPU 68 of the control mechanism 66 to generate control signals through transducer interface 64 for the individual components of the thermal conditioning assembly 20.

Figure 3:
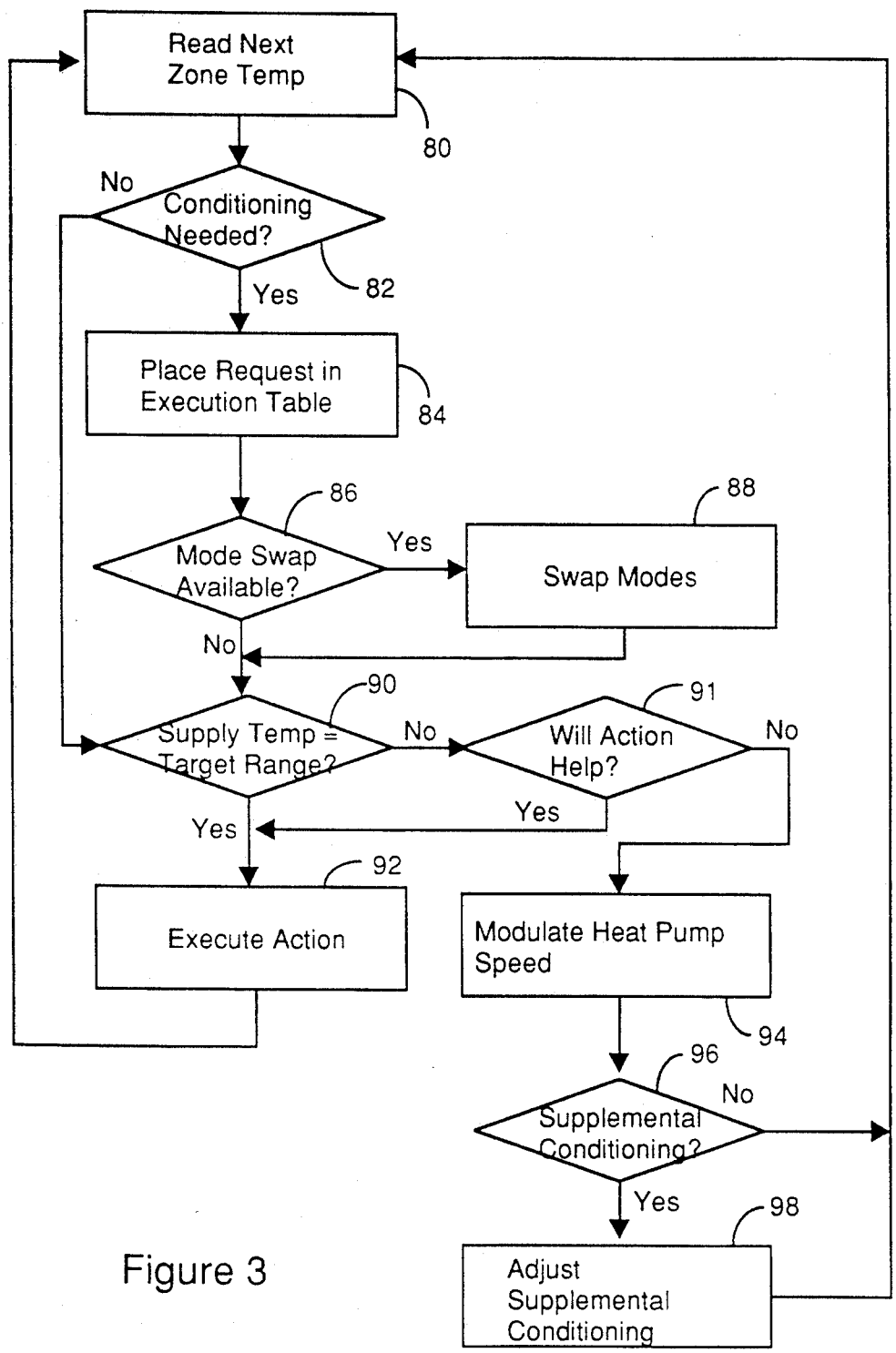
FIG. 3 is a zone control scheme in accordance with the invention.

The zone controller 72 of the present invention is depicted in flow chart form in FIG. 3. The first step associated with the zone controller 72 is to read a zone temperature (block 80). As previously mentioned, each zone 46 includes a thermostat 50 which can provide the zone temperature data. The zone temperature data is compared with a target temperature, which is set by the thermostat 50 of each zone, to determine whether thermal conditioning is needed (decision block 82). The target temperature may be a temperature range, as will be further discussed below.

If the zone temperature data corresponds to the target temperature, then conditioning is not needed, and another inquiry is processed (decision block 90), which will be discussed below. If the zone temperature data does not correspond to the target temperature, then a request for conditioning is placed in an execution table data structure.

This process is more fully illustrated with reference to FIGS. 4A and 4B. FIG. 4A represents a status table which stores information in memory 70 on the status of the heat exchange device 48 within each zone 46. In other words, the status table stores information as to whether the heat exchange device 48 within a particular zone 46 is on or off. In this example, the status table stores the following information: Zone-A is off; Zone-B is off; Zone-C is on; Zone-D is off; etc.

Returning to FIG. 3, initially the temperature of Zone-A is read (block 80). If conditioning is needed in Zone-A because the zone temperature data does not correspond with the target temperature, then a request for conditioning is placed in an execution table data structure. In particular, as reflected in FIG. 4B, a request to turn on the heat exchange device of Zone-A is placed in an execution table which is stored in memory 70. The execution table may be a First-In-First-Out (FIFO) structure, or some type of weighted structure which will be discussed below.

The next step associated with the invention is to assess the execution table to determine whether a mode swap is available (decision block 86). At this juncture there is only one request in the execution table (Zone-A: On), so a mode swap (block 88) is not available.

If a mode swap is not available, a decision is made as to whether the temperature of the thermal distribution medium, or supply temperature, is within a target range (decision block 90). The temperature of the thermal distribution medium may be taken by thermometer 38. The target range for the distribution medium will depend upon a number of conditions. For example, in the heating mode, a reasonable target range would be between 105° and 120° F. In the cooling mode, a reasonable target range would be between 43° and 4820 F.

If the thermal distribution medium is within the target range, then the next request within the execution table may be processed (block 92). In other words, if the thermal distribution medium is at its intended temperature, then the activation of an additional heat exchange device 48 within a zone may be undertaken.

On the other hand, if the thermal distribution medium is not within its target range, then instead of processing an additional request which might cause the distribution medium to drift further from its target range, an inquiry is made to determine whether undertaking the action will help the supply temperature become closer to its target range (decision block 91). For instance, if the supply temperature is above its target range and there is a request to turn on a heat exchange element 48 (with its resultant impact of reducing the supply temperature), then the action is executed (block 92). Otherwise, the speed of the heat pump 22 is modulated (block 94). For example, if the supply temperature is too low, and a variable speed heat pump is being used, then the speed of the heat pump will be increased. Modulating the heat pump may involve turning it off. Of course, if the heat pump is at its maximum speed, modulation will not occur and supplemental conditioning will be invoked (block 98).

After modulating the speed of the heat pump (block 94), a decision is made to determine whether supplemental conditioning is required (decision block 96). As previously stated, it is desirable to minimize the use of supplemental conditioning. A number of criteria may be used to determine whether supplemental conditioning is required. For instance, if the supply temperature has not been within its target range for a given amount of time and the heat pump is at its highest speed, then an adjustment of supplemental conditioning may be invoked (block 98). Supplemental conditioning may include turning "on" or "off" a supplemental conditioning element, such as a resistive heater. Generally, if supplemental conditioning is invoked, then the heat pump speed may be locked its maximum speed.

Regardless of whether supplemental conditioning is invoked, the next zone temperature is then read (block 80). Returning to the example associated with FIG. 4A, the temperature of Zone-B, which has a heat exchange device which is off, would be read (block 80). A decision is then made to determine whether conditioning is needed within the zone (decision block 82). In this example, conditioning is needed in Zone-B, therefore a request to turn on the heat exchange device within Zone-B is placed within the execution table, as reflected in FIG. 4B. A mode swap is still unavailable within the execution table (decision block 86), so the supply temperature is tested (decision block 90). By way of example, assume that the supply temperature does not meet the target range and activating a heat exchange unit 48 will not help (decision block 91), then the heat pump speed would be modulated (block 94), although it is determined that supplemental conditioning (decision block 96) is not required.

The next step associated with the example is a temperature reading within Zone-C, which has a heat exchange device which is on. In this example, the heat exchange device is generating heat beyond that required by the target temperature, therefore action is needed to reduce the heat. This request is placed in the execution table of FIG. 4B (block 84). A decision is then made to determine whether a mode swap is available (decision block 86). At this juncture a mode swap is available. A mode swap occurs when the net result of an action does not have a substantial influence upon the temperature of the thermal distribution medium. Thus, if one heat exchange device is turned on while another heat exchange device is turned off, then the net influence upon the temperature of the thermal distribution medium is usually minimal. As reflected in the execution table of FIG. 4B, the heat exchange device of Zone-C desires to go off while the heat exchange device of Zone-A desires to go on. Thus, a mode swap is available and a mode swap transpires (block 88). In other words, the heat exchange device of Zone-C goes off, while the heat exchange device of Zone-A goes on. Both of the requests would then be removed from the execution table. Therefore, only request "2. Zone-B: On" would remain in the execution table (block 80). The mode swap inquiry (decision block 86) may be made prior to placing a request in the execution table.

After the mode swap (block 88), a determination is made as to whether the supply temperature is within the target range (decision block 90). If the supply temperature is not within the target range and an action will not help (decision block 91), then the heat pump would be modulated (block 94). Assuming that supplemental conditioning is not required, the next step of the present example entails reading the temperature in Zone-D. Assuming that Zone-D is off, but conditioning is needed (decision block 82), a request to activate the heat exchange device of Zone-D is placed in the execution table. The execution table now includes two requests: "2. Zone-B: On" and "4. Zone-D: On". Since the same actions are requested, a mode swap is not available (decision block 86). Assuming that the supply temperature is now at its target range (decision block 90), the next request in the execution table ("2. Zone-B: On") may be processed (block 92). The process is then repeated.

The heat pump controller 72 disclosed in FIG. 3 in conjunction with the example of FIGS. 4A and 4B has a number of advantages which will be recognized by those skilled in the art. In the absence of this approach, systems check a zone temperature to determine whether conditioning is needed. If conditioning is needed, the request is processed immediately. As a result, the temperature of the thermal distribution medium is constantly changing. In other words, it is widely varying from a mean or average temperature. Therefore, it may operate inefficiently or cause occupant discomfort. Moreover, supplemental thermal conditioning is likely to be used to meet the temperature excursions.

The present invention departs from this indiscriminate approach. With the present invention, the temperature of the thermal distribution medium is strictly maintained within a given range. In other words, a more efficient steady temperature is established with the present invention. This is accomplished by stabilizing the thermal distribution medium prior to processing new requests.

As exhibited in FIG. 3, a request for conditioning is not immediately processed. Instead, the request is stored in an execution table. The request may be rapidly processed if a mode swap is available. That is, a request for conditioning may be quickly satisfied if the net impact of the request will not largely alter the temperature of the thermal distribution medium. On the other hand, if a mode swap is not available, there is a potential impact on the thermal distribution medium. If the thermal distribution medium is in its desired condition (decision block 92), then the request may be processed. Or, if the action requested will help stabilize the supply temperature (decision block 91), then the request may be processed. Otherwise, the heat pump is adjusted (block 94) to reach the desired supply temperature.

Thus, through the present control scheme, wide variations in the supply temperature are avoided. Consequently, the heat pump operates more efficiently. In addition, by avoiding temperature excursions, the use of supplemental thermal conditioning may be minimized.

Figure 5:
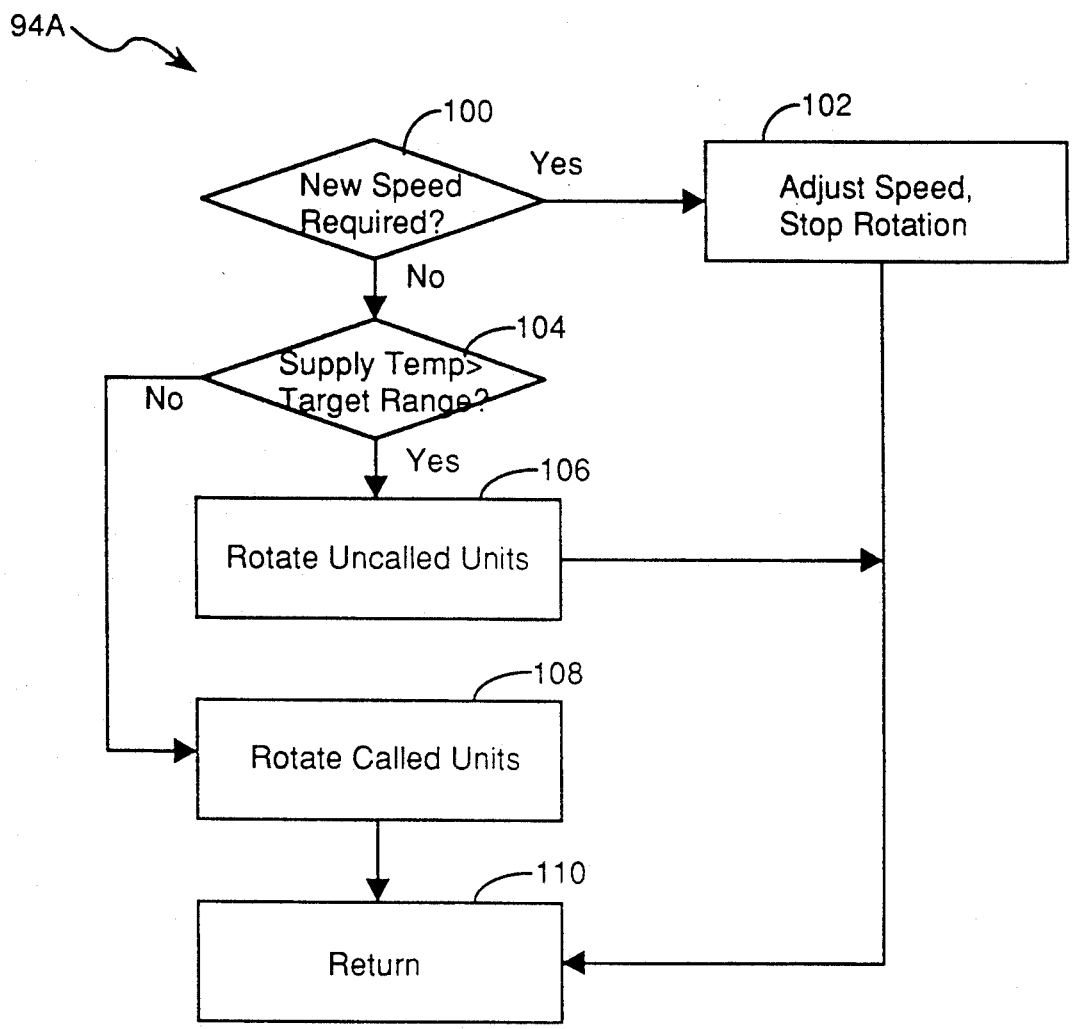
FIG. 5 is a zone control scheme which may be used with a multiple speed heat pump assembly.

The heat pump modulation step (block 94) is based upon a variable speed heat pump device. If a multiple speed heat pump device is employed, then the control scheme of FIG. 5 is preferably employed. In other words, instead of modulating the heat pump, the control scheme 94A of FIG. 5 is utilized.

The first step associated with multiple speed heat pump "modulation" 94A is to assess whether a new speed is required (decision block 100). If a new speed is required, then the new speed is invoked (block 102). For example, in the heating mode, if more heat is required, then an adjustment from the low speed to the high speed may be executed. This step also involves stopping the rotation of units, which will be discussed below.

If a new speed is not required (decision block 100), then a determination is made as to whether the supply temperature (the thermal distribution medium temperature) is greater than or less than the target range (decision block 104). If the supply temperature is greater than the target range, then the uncalled heat exchange units within the multizone building are rotated (block 106). For example, in the heating mode the supply temperature may be too high as a result of the number of heat exchange devices which are activated. In other words, the activated heat exchange devices are not removing sufficient heat from the thermal distribution medium with the consequence that the thermal distribution medium is too high for the given mode. The uncalled unit rotation (block 106) disposes of this additional heat and brings the supply temperature back to its desired range. This is accomplished by activating the unactivated heat exchange devices within the multiple zone building. In other words, although the unactivated zones are not requesting heat, to bring the supply temperature back to its target range, heat is removed from the thermal distribution medium by activating heat exchange devices within the zones and thereby removing heat from the thermal distribution medium into the zones. Preferably, no single zone absorbs the extra heat from the thermal distribution medium, rather uncalled zones are preferably rotated to distribute the extra heat.

If the supply temperature is less than the target range, then the activated heat exchange devices are rotated (block 108). In this case, the supply temperature of the thermal distribution medium is not high enough to adequately heat the number of zones which are requesting heat. Thus, to prevent the thermal distribution medium from falling below its target temperature range, all zones requesting heat do not receive it simultaneously. Instead, the heat exchange devices within the individual zones are rotated so that the supply temperature may be maintained while not depriving any single zone of heat for an extended period of time.

Thus, regardless of whether a multiple speed or a variable speed heat pump is employed, the present invention provides a control scheme for maintaining the supply temperature of the thermal distribution medium within a relatively narrow range. Consequently, the heat pump is not required to follow widely varying thermal conditioning requests which may produce widely varying supply temperatures.

The control scheme of the invention and its associated benefits have been demonstrated. Attention now turns to additional design considerations preferably associated with the invention.

It should be recognized that the thermal conditions in individual zones 46 may vary. For example, large zones may have more than one heat exchange device 48 operated from the same thermostat 50. Heat exchange devices 48 themselves could have various capacities. Small zones 46, such as bathrooms, could have downsized terminal units. Whenever the disclosure refers to a count of the number of zones asking for heating or cooling as an input to the control action, this may be interpreted to be a "weighted count" where each zone is "weighted" by the relative capacity of the zone's heat exchange devices. Such a weighting scheme may be used to alter the sequence in which thermal conditioning requests are processed.

A priority switching scheme may be established by providing an error signal from each thermostat 50. Based upon the relative magnitude of the error, priorities could be established for which heat exchange device 48 to bring on first, that with the larger error being given highest priority. The cumulative time that each zone has been waiting to be actuated may also be relied upon to give priority.

The thermal storage device 30 facilitates smooth responses to thermal load variations. For the best performance in the normal heating mode and in the cooling mode, the tank temperature is preferably de-stratified to prevent the formation of a thermocline within the thermal storage device 30. In other words, the thermal distribution medium is preferably mixed within the storage device to achieve a uniform temperature. By avoiding the formation of a thermocline, changes of the returned distribution medium and excess heat pump capacity will be absorbed by the entire storage device 30, which will minimize the rate of the supply temperature changes.

Supplemental thermal conditioning may be achieved by placing a resistive thermal heater 32 within the thermal storage device 30. Preferably, the thermal heater 32 is positioned in the top portion of the storage device, near the outlet, so that it may function as an instantaneous heater while providing heat in a localized area. The heat pump condenser or evaporator may be installed in the lower portion of the storage device 30. If a thermal heater 32 is used, supplemental thermal conditioner 36 will not be required.

One skilled in the art will recognize that dual storage tanks, one hot and one cold, may be used in conjunction with the zone controller 66 of the invention. In this case, the heat pump 22 conditions the two tanks simultaneously until one is set at its desired temperature. At that point it accesses the outdoor heat exchanger 24. The remaining tank is then charged. When the remaining tank reaches its desired temperature, the heat pump 22 turns off. The heat pump is only turned on if one tank temperature goes out of a specialized control range. It should be obvious that with appropriate valving and manifolding, the individual fan coils may access either the hot or the cold tank so that some zones may be heated, while others are cooled, if that is necessary. Control of the system based upon storage is always the same except that a controlling tank must be identified. The control system will operate as in the previous examples; for instance, the control system will determine how many fan coils can operate to prevent rapid changes in the tank temperature.

As previously discussed, the use of supplemental conditioning may be predicated on a number of factors. One factor may be that the heat pump is at high speed, but the supply temperature is still below its target range. Another factor may be the outdoor temperature as read from thermostat 54. Whatever factor is chosen, the approach should be such that it is consistent with the prevailing scheme for stabilizing the supply temperature with minimal thermal excursions.

Usually, there is more than one stage of supplemental heating. Supplemental heating may be accomplished by fossil-fuel instead of electric heating. In this case, it may be more economical to size the supplemental heating so that it is adequate with the heat pump off, because the heat pump efficiency is marginal at low outdoor temperatures.

The control scheme associated with the invention may be substituted with a more "knowledgeable" scheme which does not rely upon the relationship between the supply temperature and the target range. For instance, such a scheme would know to rotate uncalled units if the outdoor temperature was at a given value, the interior thermal condition was at a given value, and the number of activated heat exchange devices was at another value. Regardless of the scheme employed, the prevailing scheme for dampening thermal excursions of the thermal distribution medium is employed.

The decision of whether conditioning is needed in a given zone (block 82) is preferably based upon a comparison of the present temperature within the zone versus a predefined dead band. In this context, in the heating mode a request for activation of a heat exchange device would be made if the temperature is below the bottom of the dead band, while a request to deactivate the heat exchange device would be made if the temperature is above the top end of the dead band. In the cooling mode, the reverse occurs.

The heat pump 22 is originally turned on in response to a number of predetermined operating conditions. For example, the supply temperature must be outside of its target range and a minimum number of heat exchange units 48 must be turned on. The original speed of the heat pump may be set by considering parameters such as the difference between the storage tank 30 temperature and the supply temperature, and the number of heat exchange devices 48 requesting activation.

The foregoing descriptions of specific embodiments of the present invention are presented for purposes of illustration and description. They are not intended to be exhaustive or to limit the invention to the precise forms disclosed, obviously many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents.

We claim:

1. An apparatus for thermal conditioning, said apparatus comprising:
    means for generating a desired thermal condition, said desired thermal condition being conveyed to a plurality of predetermined locations by a thermal distribution medium, said plurality of predetermined locations including a corresponding plurality of heat exchange devices for receiving said thermal distribution medium and a corresponding plurality of thermostats for indicating a chosen thermal condition and a prevailing thermal condition;
    means, coupled to said plurality of thermostats, for storing a plurality of thermal conditioning requests, each of said thermal conditioning requests being produced when said prevailing thermal condition is inconsistent with said chosen thermal condition;
    means, coupled to said storing means, for selecting one of said plurality of thermal conditioning requests to establish a selected conditioning request;
    means for comparing the temperature of said thermal distribution medium with a target range to establish a thermal modulation flag when said temperature of said thermal distribution medium is outside said target range, and a thermal verification flag when said temperature of said thermal distribution medium is within said target range;
    means for adjusting said generating means in response to said thermal modulation flag produced by said comparing means; and
    means for executing said selected conditioning request in response to said thermal verification flag produced by said comparing means.

2. The apparatus of claim 1 further comprising:
    means for servicing two of said thermal conditioning requests by simultaneous execution of said thermal conditioning requests when one of said thermal conditioning requests has an opposite thermal effect on said thermal distribution medium as another one of said thermal conditioning requests.

3. The apparatus of claim 2 wherein said adjusting means includes means for modulating said generating means.

4. The apparatus of claim 3 wherein said modulating means includes means for rotating activation of said plurality of heat exchange devices.

5. The apparatus of claim 1 wherein said selecting means selects said selected conditioning request on the basis of a First In First Out value.

6. The apparatus of claim 1 wherein said selecting means selects said selected conditioning request based upon a predetermined rank assigned to said selected conditioning request.

7. The apparatus of claim 1 wherein said executing means includes means for activating said plurality of heat exchange devices.

8. An apparatus for thermal conditioning, said apparatus comprising:
    a heat pump for generating a desired thermal condition, said desired thermal condition being conveyed to a plurality of predetermined locations by a thermal distribution medium, said plurality of predetermined locations including a corresponding plurality of heat exchange devices for receiving said thermal distribution medium and a corresponding plurality of thermostats for indicating a chosen thermal condition and a prevailing thermal condition; and
    a heat pump controller, coupled to said heat pump, including:
        means, coupled to said plurality of thermostats, for storing a plurality of thermal conditioning requests, each of said thermal conditioning requests being generated when said prevailing thermal condition is inconsistent with said chosen thermal condition for one of said plurality of predetermined locations;
        means, coupled to said storing means, for selecting one of said thermal conditioning requests to create a selected thermal conditioning request;
        means for comparing the temperature of said thermal distribution medium with a target range to establish a thermal verification flag when said temperature of said thermal distribution medium is within said target range; and
        means, coupled to said comparing means, for executing said selected thermal conditioning request when said thermal verification flag is established.

9. The apparatus of claim 8 wherein said comparing means sets a thermal modulation flag when said temperature of said thermal distribution medium is outside said target range.

10. The apparatus of claim 9 further comprising means for modulating said heat pump when said thermal modulation flag is set.

11. The apparatus of claim 8 further comprising:
    means for servicing two of said thermal conditioning requests by simultaneous execution of said thermal conditioning requests when one of said thermal conditioning requests has an opposite thermal effect on said thermal distribution medium as another one of said thermal conditioning requests.

12. The apparatus of claim 8 wherein said executing means include means for activating at least one of said plurality of said heat exchange devices.

13. The apparatus of claim 10 wherein said modulating means includes means for rotating activation of said plurality of heat exchange devices at said plurality of predetermined locations.

14. A method of operating a heat pump which generates a desired thermal condition which is conveyed to a plurality of predetermined locations by a thermal distribution medium; said method comprising the steps of:
    reading a plurality of zone temperatures;
    comparing each of said plurality of zone temperatures with a corresponding chosen temperature range to generate a plurality of conditioning requests when said chosen temperature range is inconsistent with said corresponding zone temperature;

establishing an execution table to store said conditioning requests;

contrasting the temperature of said thermal distribution medium with a target range to establish a thermal verification flag when said temperature of said thermal distribution medium is within said target range, and a thermal modulation flag when said temperature of said thermal distribution medium is outside said target range;

executing one of said conditioning requests when said thermal verification flag is set; and modulating said heat pump when said thermal modulation flag is set.

15. The method of claim 14 further comprising the step of:

servicing two of said conditioning requests by simultaneous execution of said conditioning requests when one of said conditioning requests has an opposite thermal effect on said thermal distribution medium as another one of said conditioning requests.

16. The method of claim 14 wherein said executing step involves activating a heat exchange device in one of said predetermined locations.

17. The method of claim 14 wherein said modulating step includes the step of rotating activation of a plurality of heat exchange devices at said plurality of predetermined locations.

18. The method of claim 17 wherein said plurality of heat exchange devices were previously activated.

19. The method of claim 17 wherein said plurality of heat exchange devices were previously unactivated.

20. The method of claim 14 wherein said modulating step includes the step of activating said heat pump in response to a set of predetermined operating conditions.

* * * * *